United States Patent [19]

MaCleod

[11] Patent Number: 4,499,407

[45] Date of Patent: Feb. 12, 1985

[54] BRUSHLESS DC MOTOR ASSEMBLY WITH IMPROVED STATOR POLE

[75] Inventor: Donald J. MaCleod, Aptos, Calif.

[73] Assignee: Applied Motion Products, Inc., Scotts Valley, Calif.

[21] Appl. No.: 459,797

[22] Filed: Jan. 21, 1983

[51] Int. Cl.³ .............................................. H02K 29/00
[52] U.S. Cl. .................................... 318/254; 318/138; 318/439; 310/156; 310/187
[58] Field of Search ................ 310/46, 68 R, 156, 178, 310/180, 181, 187, 216; 318/138, 254, 254 A, 439

[56] References Cited

U.S. PATENT DOCUMENTS

| | | | |
|---|---|---|---|
| 2,715,690 | 8/1955 | Neuenshwander | 310/254 X |
| 4,012,651 | 3/1977 | Burson | 310/156 X |
| 4,217,508 | 8/1980 | Uzuka | 310/46 |
| 4,393,339 | 7/1983 | Kimura | 318/254 A |
| 4,429,263 | 1/1984 | Müller | 318/138 X |

FOREIGN PATENT DOCUMENTS

| | | | |
|---|---|---|---|
| 2835210 | 2/1980 | Fed. Rep. of Germany | 318/254 |
| 0166473 | 12/1980 | Japan | 318/254 |

Primary Examiner—William M. Shoop
Assistant Examiner—Bentsu Ro
Attorney, Agent, or Firm—Michael J. Hughes

[57] ABSTRACT

The present invention is an improved brushless direct current (DC) motor for use in various applications, including disk drives in data processing applications. The improved motor includes a rotor portion, containing a ring magnet with alternately radially polarized zones, a shaft portion, a stator portion, having a stator stack, and conducting windings and power and control circuitry. The stator stack includes a plurality of poles, each pole having a greater amount of magnetic material at one end than the other end. The structure of the stator stack poles urges the rotor portion to detent positions from which it is magnetically driven to rotation upon application of winding current and further urges rotation upon current application regardless of rotor position. The improved motor provides an economical, reliable starting rotation motor which functions in an unimpeded fashion at normal operating speeds and is adaptable as a rotational motion source for a variety of applications.

6 Claims, 6 Drawing Figures

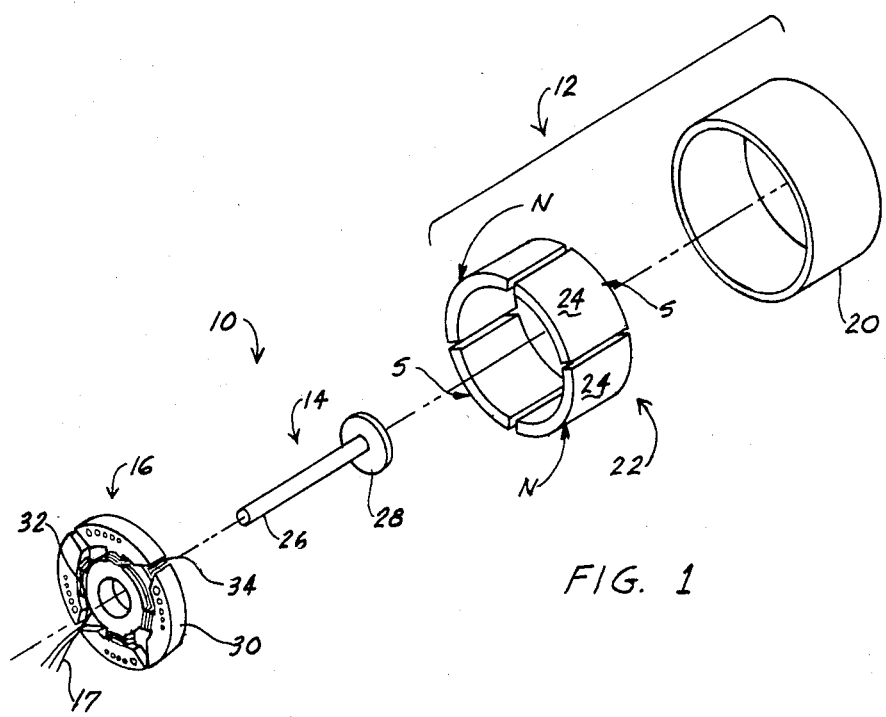
FIG. 1
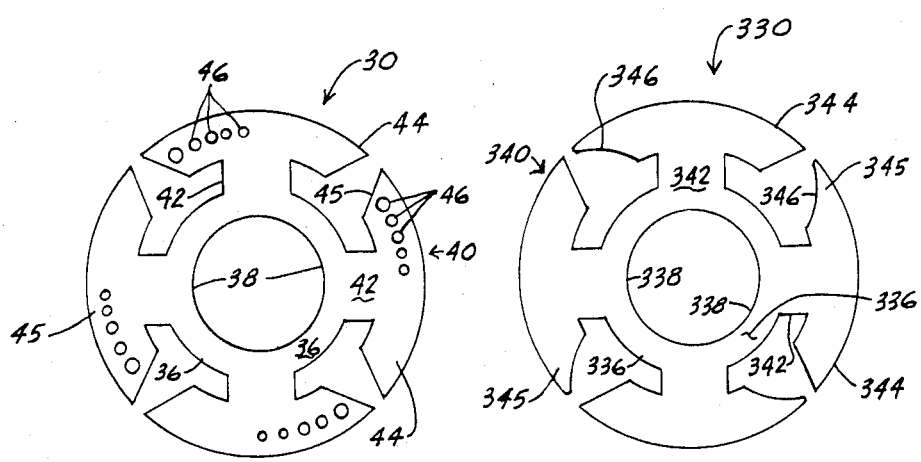
FIG. 2
FIG. 3

BRUSHLESS DC MOTOR ASSEMBLY WITH IMPROVED STATOR POLE

TECHNICAL FIELD

The present invention relates generally to electrical motors and more particularly to brushless direct current (DC) electrical motors. The predominant current usage of the improved brushless DC motor assembly of the present invention is in connection with motors utilized to power Winchester disk drives in the data processing industry.

BACKGROUND ART

The brushless DC motor is a mainstay of the data processing industry. This type of motor is widely used in low weight loading, high speed, precision control applications. One of the main usages for brushless DC motors is in hard disk drives in the data processing field.

The construction of brushless DC motors has long been known in the industry. These motors are constructed in many different phases and excitation modes. These differences are caused by modifications of the control circuitry, number of commutating devices and configurations of the rotor magnets, stator stacks and windings of the motor. A typical motor of one of these types is shown and described in the applicant's co-pending application for a "Magnetic Motor Tachometer Assembly", Ser. No. 06/429,076, filed Sept. 30, 1982. The motor shown therein is of the two phase multipolar excitation type.

The simplest type of brushless DC motor is the two phase unipolar excitation motor. In this type of motor current is passed through a given conducting wire in the winding in a single direction only. Two phase unipolar excitation motors are more easily and economically constructed than more complex versions. They are therefore a desirable type of motor for most applications.

One inherent problem with two/phase unipolar excitation brushless DC motors relates to the occasional inability of the motor to start automatically. Due to the magnetic stability factors discussed in detail below, it would frequently be the case that an unmodified brushless DC motor of this type would come to rest in a position from which it will not readily start upon application of induction current. Obviously, this is an undesirable situation.

One possible method of overcoming this difficulty is to apply mechanical or manual initial rotation to the rotor portion of the motor. Such an approach is not always feasible at all due to the inaccessibility of the elements controlled by the rotor and is occasionally even damaging to the equipment. Consequently, the method is not used.

Another approach which has been attempted in the prior art to overcome this difficulty is modifying the location of the magnetically stable rest points, known as detent positions, or zero torque nodes for the rotor. This approach is reflected in the motors marketed by the PAPST Company and the SINANO TOKKI Company. Each of these motors attempts to modify the magnetic detent positions by modifying the air gap between the rotor and the stator pole such that the rotor is urged towards one end of the pole.

The PAPST motor uses stator poles that are slanted with respect to the rotor such that there is a narrower air gap between the rotor and one end of the pole than the other end. In this manner, the magnetic attraction is stronger at the closer end and the rotor is urged towards the closer end of the pole. Since the rotor is then aligned off center on the pole the rest point is destabilized with respect to the application of electrical current and the motor will always start.

The SINANO TOKKI motor uses a similar principle in that each stator pole is divided into a longer portion and a shorter portion. The air gap between the rotor and the shorter portion of the pole is significantly greater than that between the rotor and the longer portion of the pole. Again, the permanent magnet on the rotor are urged towards the longer portion of the pole where the narrower air gap exists. This results in the same offset rest positions and instant starting as the PAPST motor.

The variable air gap methods of creating instant starting two phase unipolar excitation brushless DC motors has a significant disadvantage that the operation of the motor at normal high operating speed is degraded. Since a portion of the stator poles have a greater air gap than other portions there is an uneven magnetic field across the pole which tends to unbalance the rotor. Furthermore, the magnetic flux linked with the winding is limited by the increased air gap at a portion of the pole. This necessarily results in a reduction of potential motor output power.

No prior art method is presently known for providing an instant starting two phase unipolar excitation brushless DC motor which has optimum performance at normal operating speeds. The difficulties of instant starting, maximum power and good rotor balance have not heretofore been combined.

DISCLOSURE OF INVENTION

Accordingly, it is an object of the present invention to provide an improved two phase unipolar excitation brushless DC motor which will always start upon application of electrical power.

It is another object of the present invention to provide an improved sure-starting DC motor which does not have impaired performance at high rotational speeds.

It is another object to provide an improved brushless DC motor which can be easily and economically manufactured.

The present invention is an improved brushless DC motor assembly adapted to start rotation upon initial application of electrical energy in all cases. The improved motor assembly is predominantly used in disk drives for $5\frac{1}{4}$ Winchester style disks.

Briefly, a preferred embodiment of the present invention is an improved brushless DC motor assembly of the two phase unipolar excitation type, including a rotor portion, a stator portion, a shaft portion and electrical power supplies and control circuitry. The rotor portion includes a cylindrically shaped cap and a ring magnet divided into four alternately polarized zones of equal size and shape. The rotor portion is rigidly connected to the shaft such that they rotate about the axis of the shaft with relationship to the stationary stator portion. The stator portion includes a unitary stator stack including four anchor shaped pole portions, a pair of opposing conducting windings wrapped about the pole portions and a Hall effect sensor. The electrical power and control apparatus provide conventional two-phase electrical signals to the stator windings in order to induce rotation of the rotor. In the preferred embodiment, one end of each of the anchor shaped poles of the stator stack is modified in order to decrease the magnetic attraction of the ring magnet zone of the rotor when no power is applied to the windings. In the most preferred embodiment, this is accomplished by removing material from one end of each anchor shaped pole portion.

It is an advantage of the present invention that the only modification required from traditional construction of basic symmetrical two phase unipolar excitation DC motors is the removal of material from portions of the stator stack.

It is another advantage of the present invention that the improved stator stack maintains a constant air gap between the pole portions and the polarized zones at the ring magnet such that high velocity performance is maintained at optimum magnetic field strength and rotor balance levels.

A further advantage of the present invention is that the instant start modifications provided do not otherwise affect performance.

It is yet another advantage of the present invention that the magnetic reluctance response of the stator stack poles permit the motor to operate as an unmodified motor at high velocity—low current operational conditions.

These and other objects and advantages of the present invention will become clear to those skilled in the art in view of the description of the best prsently known mode of carrying out the invention and the industrial applicability of the preferred embodiment as described herein and as illustrated in the several figures of the drawing.

BRIEF DESCRIPTION OF THE DRAWING

FIG. 1 is an exploded perspective view of an improved brushless direct current electrical motor assembly according to the present invention;

FIG. 2 is a plan view of a preferred stator stack;

FIG. 3 is a plan view of an alternate embodiment of a stator stack;

BEST MODE OF CARRYING OUT INVENTION

Figure 4:
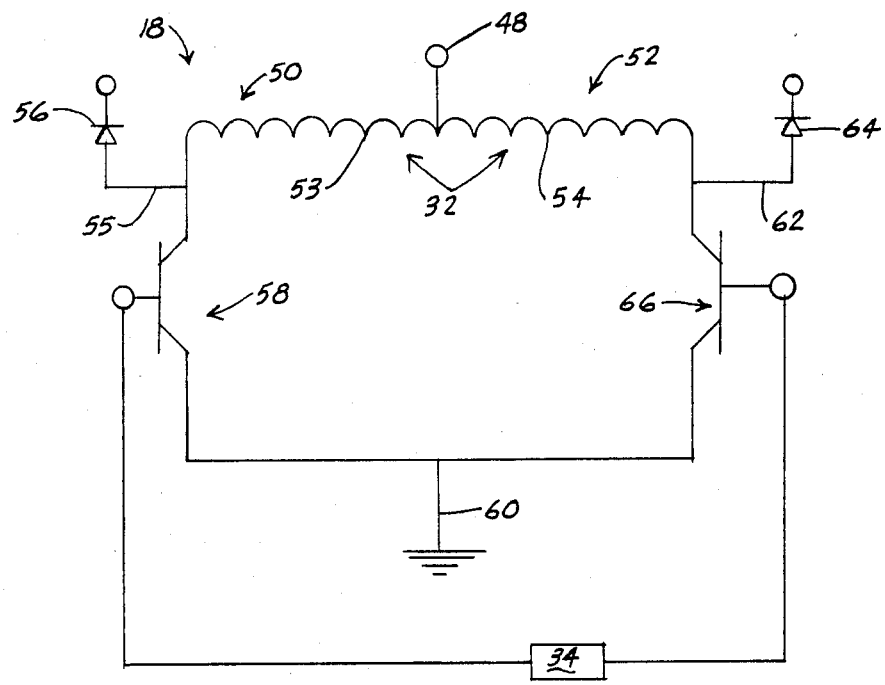
FIG. 4 is a schematic diagram of the electrical control and power supply circuitry of the present invention.

The best presently known mode of practicing the present invention is an improved brushless DC electrical motor assembly particularly characterized by its instant starting ability and unimpaired operation at high speeds. The improved motor assembly is very similar in construction to conventional DC brushless motors and is utilized in the same applications as conventional motors, particularly including positional and rotational drives for information storage disks.

The presently preferred improved motor assembly is illustrated in an exploded perspective manner in FIG. 1, and is designated by the general reference character 10. The motor assembly includes a rotor portion 12, a shaft portion 14, a stator portion 16, and conductive wires 17 connecting the stator portion 16 to external electrical power supply and control circuitry means 18 (illustrated in FIG. 4).

The rotor portion 12 includes a cover 20 and a ring magnet 22. The cover 20 is cylindrical in shape and is closed on one end. The cover 20 provides structural integrity to the rotor portion 12. The ring magnet 22 is rigidly bonded to the interior surface of the cover 20.

The ring magnet is divided into four alternately polarized zones 24. Each zone 24 is identical in size and shape to the others. All the zones 24 are radially polarized. However, as is shown in FIG. 1, opposite zones are polarized radially in the same direction while adjacent zones are polarized in radially opposite directions. In conventional annotation radially inward polarization is referred to as North while radially outward polarization is referred to as South.

The shaft portion 14 includes a shaft element 26 and a mounting plate 28. The mounting plate 28 is rigidly attached to one end of the rigid balanced shaft 26 and provides a means by which the shaft portion 14 is rigidly attached to the cover 20. When the shaft portion 14 and the rotor portion 12 are rigidly bonded together, they rotate conjunctively about the long axis of the shaft 26 when the motor is in operation.

The stator portion 16 includes a stator stack element 30, a plurality of windings 32 and a Hall effect sensor 34. The preferred stator stack 30 is more particularly illustrated and described in conjunction with FIG. 2. The windings 32, in the preferred embodiment, include two conducting wires wound in opposite directions about the stator stack 30. In this manner, when the current is delivered to the windings 32, as illustrated in FIG. 4, the poles of the stator stack 30 will be oppositely electromagnetically polarized depending on the direction of current.

The Hall effect sensor device 34 senses the magnetic polarity of the polarized zone 24 of the ring magnet 22 that is opposite the Hall effect sensor 34 at any given time. In operation, the Hall effect sensor 34 senses the polarized zones 24 as the rotor portion 12 rotates about the stator portion 16. The Hall effect sensor 34 is connected by one of the conductive wires 17 to the control circuitry 18 and causes the direction of current in the winding 32 to reverse upon a change of polarity. This causes the rotor portion 12 to continue rotating about the stator portion 16 as the polarized zones 24 are continually drawn forward magnetically towards opposingly polarized poles on the stator stack 30.

The preferred embodiment of the stator stack 30 is illustrated in FIG. 2 in a plan view. The stator stack 30, so named because it is typically constructed as a stack of laminated layers, includes an inner ring portion 36 which forms a shaft aperture 38 in the center thereof. Four identically shaped pole portions 40 extend radially from the inner ring 36 to form a discontinuous outer ring. Each of the pole portions 40 in the preferred embodiment is shaped similarly to an anchor and includes a post portion 42 and a pair of prong portions 44. One prong is unmodified while the other end of the pole portion is a modified prong 45.

In the preferred embodiment the modified prong 45 of each pole portion 40 is provided with a series of holes 46. The modified prong 45 is the same for each pole 40 and the holes 46 are of identical size and relative position for each pole 40. The holes 46 are arrayed with a larger hole towards the end of the modified prong 45 and decreasing size holes arrayed towards the center of the prong 44. In this manner there is a greater difference in balance between the extreme ends of the modified prongs 45 and the unmodified prong 44 for any given pole portion 40 than exists at the confluence of the prongs 44 and 45.

An alternate embodiment of a stator stack according to the present invention is illustrated in a plan view in FIG. 3. The alternate stator stack, designated by the reference character 330, is very similar in construction to the stator stack 30 shown in FIG. 2. Alternate stator stack 330 includes an inner ring portion 336 bounding a shaft aperture 338 and four identically shaped pole portions 340 radially arrayed thereabout. Each of the pole portions 340 includes a post portion 342 and a pair of prong portions 344 and 345.

The difference between alternate stator stack 330 and preferred stator stack 30 lies in the manner in which the prong 345 of each pole portion 340 is modified. In the alternate stator stack 330 the modification is accomplished by cutting or milling a depression 346 on the interior portion of modified prong 345. The depression 346 is tapered so as to be more severe toward the end of the prong 345 than toward the center. This modification accomplishes the same purpose as the decreasing sized holes 46 of the preferred stator stack 30. Depressions 346 are made on the interior surface of the prong 345 such that the air gap between the poles 340 and the polarized zones 24 of the ring magnet 22 is not affected by the material removal.

Referring now to FIG. 4, the specific construction of typical electrical power and control means 18 is illustrated in schematic fashion. In this illustration it can be seen that the electrical power supply and control means 18 includes a direct current power supply 48 which deliver electrical energy through the windings 32. Electrical current is delivered from the power supply 48 which delivers electrical energy through the windings 32. Electrical current is delivered from the power supply 48 through a first network 50 and the second network 52. The first network 50 and the second network 52 are symmetrical and essentially identical in construction and control the direction of polarization of the pole portions 40 on the stator stack 30.

The first network 50 controls current flow through a first conducting wire 53 which forms a part of the windings 32. Similarly, the second network controls current flow through a second conducting wire 54. Both the first conducting wire 53 and the second conducting wire 54 are wrapped about the post portions 42 of the stator stack 30 in order to induce a magnetic field in the pole portions 40 when a current is passed through the conducting wire. The wrapping is accomplished such that adjacent stator poles 40 are oppositely polarized by the application of current through either first conducting wire 53 or second conducting wire 54. The first and second conducting wires 53 and 54 are identical in construction and are wrapped the same number of turns about each post 42 but differ in their direction. The direction of wrapping of first conducting wire 53 with respect to direction of current flow is exactly the opposite of the direction of wrapping of second conducting wire 54. The result of this opposing wrapping is that when current is delivered through first conducting wire 53 a given pole portion 40 will be polarized in one direction while if current is passed through second conducting wire 54 the pole portion 40 will be polarized in the opposite direction. A simultaneous current through both wires will result in a self cancelling magnetic field.

In addition to the first conducting wire 53, the first network 50 includes a first decay path 55 having a first diode 56 interposed therein and a first transistor 58 interposed between the first conducting wire 53 and a ground terminal 60.

The second network 52 includes, in addition to second conducting wire 54, a second decay path 62 including a second diode 64 and a second transistor 66 interposed between the second conducting wire 54 and the ground terminal 60.

The first transistor 58 and the second transistor 66 operate as instantaneous switches for the control circuitry 18. The transistors 58 and 66 are slaved together and are simultaneously controlled by the condition of the Hall effect sensor 34. Only two possible modes exist for the conditions of the transistors 58 and 56. Depending on the signal received from the Hall effect sensor 34, relating to the polarity of the polarized zone 24 then opposite the Hall effect sensor 34, either the first transistor 58 will be on, completing the circuit, and the second transistor 66 will be off, or exactly the reverse. In this manner, current is delivered either through the first conducting wire 53 or through the second conducting wire 54 at all times during operation of the motor 10.

The alternating polarization of the pole portions 40 is caused by the alternating activations of the first network 50 and the second network 52. This causes the rotor portion 12 of the motor 10 to rotate about the stator portion 16. The polarized zones 24 are attracted toward oppositely polarized poles 40 on the stator stack 30 and repelled from like poles. Rotational momentum keeps the rotor portion 12 rotating in the same direction. Thus, the rotor portion 12 is attracted to the forward-most opposing polarity pole 40 rather than oscillating and returning to a pole 40 which has already been passed.

Figure 5:
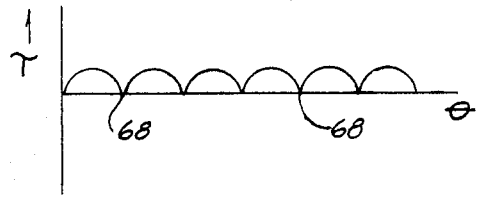
FIG. 5 is a graphical illustration of the magnetic torque with relationship to the motor position on a prior art unmodified brushless DC motor operated by the circuitry of FIG. 4.

FIG. 5 illustrates the relationship between the torque ($\gamma$) on the rotor portion 12 as a factor of the rotational position ($\theta$) of the polarized zones 24 with respect to the stator poles 40 on a conventional motor. This relationship, absent the Hall effect sensor 34 and the control circuitry means 18, would be in the form of a sine wave. However, due to the switching caused by the Hall effect sensor 34, a positive torque relationship is maintained. FIG. 5 illustrates that a number of nodes 68 exist at positions where the resultant torque on the rotor portion 12 is essentially zero. At these positions there is no inducement for the rotor to move from its position upon the activation of the power and control means 18. In operation, rotational momentum prevents the motor from stopping at the node position 68. However, when the motor is in a rest mode it is possible that it will come to rest at a position equivalent to one of the nodes 68. When this occurs, the motor will not start when current is applied. In a frictionless motor each node 68 would constitute such as infinitesimal point that no significant probability of the rotor stopping at one of the nodes 68 would exist. However, there is always a certain amount of bearing friction which impedes the free rotation of the rotor 12. This results in a widening of the nodes 68 such that failure to start is frequently a problem in conventional motors.

The imbalance in magnetic material between the modified prong 45 and the unmodified prong 44 of each pole 40 results in a reluctance-saturation effect upon the application of current to the windings 32. One of the properties of magnetic steel is that the material may become saturated in the amount of flux which may be created in the material by application of a magnetic field. The net result of saturation is a reluctance on the part of the material to conduct greater flux on application of more powerful magnetic fields. The effect is much more pronounced at high induction current (high magnetic field strength) values than at low values. The effect is also somewhat dependent on the particular shape of the magnetic conducting pathways available in the material.

In a steel stator stack 30, as illustrated in FIG. 2, the reluctance-saturation relationship has the effect that during high current conditions, such as when the motor 10 is being started up, a stronger magnetic flux is generated in the unmodified prong 44 of each pole 40 than is generated in the modified prong 45. Since there is more magnetic material, arrayed in wider portions, in the unmodified prong 44 than in the modified prong 45, the reluctance-saturation effect causes the modified prong 45 to become magnetically saturated more quickly and results in a lower net flux through the modified prong 45 than through the unmodified prong 44. This differentiation in flux causes the polarized zones 24 of the rotor 12 to be urged towards the unmodified prongs 44 and thus initiates rotation. The reluctance-saturation effect results in instant starting of the motor regardless of the rest position of the rotor with respect to the stator. The application of high current will urge rotation toward the unmodified prongs 44. One additional result is that the rotor will only rotate in one direction.

The reluctance-saturation effect for the steel used in the stator stack 30 diminishes rapidly with diminishing current levels. Thus, when the induction current is at a low value, such as during high speed operation of the motor, the reluctance-saturation effect is minimized and the flux about the modified prong 45 is essentially identical to that of the unmodified prong 44. In this manner, the motor operates normally at high speeds.

Figure 6:
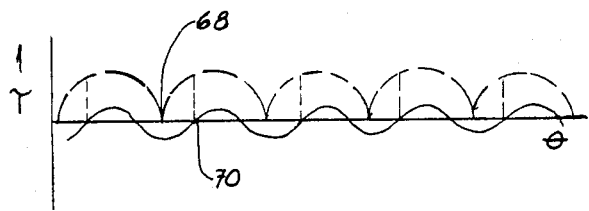
FIG. 6 is a graphical illustration of the relationship between magnetic torque and rotor position on the improved motor assembly of the present invention.

FIG. 6 illustrates the relationship of torque to rotational position on a motor 10 of the present invention. The curve of FIG. 5 is shown in phantom to illustrate the torque response generated by the passing of current through the windings 32. The second trace illustrates the rest torque, that is the magnetic torque on the rotor resulting from the permanent magnetic characteristics of the polarized zones 24 and the magnetic attraction to the stator stack 30. Even when no current is passed through the windings 32 an attraction exists since the stator stack 30 is constructed of steel. For unmodified uniform pole portions 40, the polarized zones 24 will preferably line up directly opposite the pole portions 40 such that magnetic lines of force exist directly from each portion of the polarized zones 24 across the entire length of the stator pole 40. In this situation, the preferred resting positions of the rotor 12 correspond to the nodes 68 on the electrical torque curve. This is undesirable since the motor will then not start upon current activation.

However, as is illustrated in FIG. 6, the rest torque curve for the improved brushless DC motor assembly of the current invention is offset. Since there is less magnetic conducting material in the modified prong 45 than in the unmodified prong 44 a greater attraction exists at the end of the stator pole 40 corresponding to the unmodified prong 44. This attraction differential causes the center of the polarized zone 24 to be urged toward the unmodified prong 44 of each pole 40. The resulting rest nodes 70 illustrated in FIG. 6 are thus offset from the nodes 68. In this manner, the rotor 12 will come to rest at the rest nodes 70 and upon the application of current a significant positive torque is generated as shown in phantom curve. This causes the motor to readily start. This result of the present invention is independent of the reluctance-saturation effect discussed above but is also a direct result of the stator stack modification.

The improved brushless DC motor assembly of the present invention is constructed to be nearly identical to conventional brushless DC motors. In the preferred embodiment, the only modification from conventional motor construction is the removal of magnetic material from one prong of the poles of the stator stack. Therefore, components of any prior construction, dimensions and materials that have been found to be adequate for prior use will also be adequate for the present invention.

The precise amount of material removed from the modified prong 45 is not entirely critical. As long as the rest nodes 70 are offset from the zero torque nodes 68 sufficiently that the motor will start instantly, the precise magnitude of displacement is not important. It is desirable to minimize the displacement to as low a value as will guarantee the instant start-up capability. The lesser the modification the higher the current level (lower rotational speed) at which the reluctance-saturation effect becomes insignificant. Thus a wider range of normal operation is achieved. It has been found that material removal in the range of 6 to 30 percent is sufficient.

Although the precise amount of material removal is not critical, it is important that the amount and spacing of the removal be equivalent for each pole on the stator stack 30. This is important to maintain the magnetic balance about the center of rotation such that the rotor bearings are not degraded and the performance of the motor is not impaired. It is also important that the modification be uniform along the axis of rotation. This prevents imbalances in the rotor caused by non-uniform field strength over the height of the interface.

Methods analagous to, but not identical to material removal, may also be used to modify the stator stacks magnetic field to achieve the desired results. One such method is to modify the material uniformity of the stator stack 30 by introducing concentrations or amounts of nonmagnetic material in the modified prong 45. This accomplishes the same magnetic material imbalance as the preferred embodiment.

Another, less favorable method of achieving a dependable starting motor is to modify the permanently magnetized polarized zones 24 of the ring magnet 22 rather than the stator stack 30. Although the instant start capabilities would be accomplished by removing material from one end of each of the polarized zones 24, this is not a desirable method since the balance of the rotor portion 12 would be impaired thereby. Another possible modification is to gradiate the degree of polarization of the polarized zone 24 from one edge to the other without changing the mass. While this would retain the rotational balance characteristics, there would be a disadvantage, as compared to the preferred embodiment, of being a permanent modification that would not have a dissipating effect at high rotational operation velocities. In this manner, the normal operation of the motor would be impaired by the imbalance of the magnetic field within the motor, similarly to the prior art air gap modification techniques.

Those skilled in the art will readily observe that numerous other modifications and alterations of the assembly may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The improved brushless DC motor assembly of the present invention is adaptable to any usage in which conventional DC motors are currently used. The particular use for which the improved motor assembly was developed is for Winchester disk drives for the data processing industry.

The present invention will be readily substitutable for prior art motors. The construction is a simple matter of replacing the conventional stator stack with the improved stator stack 30 of the present invention. No other aspect of the motor construction need be modified.

It is also possible to adapt existing brushless DC motors to the present invention. Existing stators maybe modified according to the teachings of the invention and thus the existing motors will be converted into the improved brushless DC motor assemblies taught herein.

In light of the significant improvements in performance of the brushless DC motor assembly of the present invention over those of the prior art, and further in light of the fact that the improved motor assemblies are very easily constructed, it is expected that the present invention will have widespread industrial utility.

I claim:

1. An improved brushless direct current electric motor comprising:
   a rotor portion including a ring magnet divided into a plurality of alternately radially polarized zones of equal size and shape;
   a shaft attached to the rotor portion and providing an axis of rotation therefor;
   A stator portion including a rigid magnetically conducting stator stack and plurality of conducting windings wrapped thereabout, the stator stack including a plurality, equal to the number of said polarized zones, of symmetrically arrayed pole portions of equal size, each said pole portion in the form of a generalized anchor shape with the arcial two pronged portion thereof arrayed outward toward said ring magnet so as to have a constant airgap therebetween, with one selected prong of each said anchor shaped pole portion having one or more apertures formed therethrough such that said selected prong includes less magnetic conducting material than the opposing prong;
   electrical power and control means for operating the motor.

2. The motor of claim 1 wherein:
   said apertures are arrayed in an arc-shaped series of different sized apertures with the largest aperture situated toward the end of said prong and decreasing in size toward the center of said pole.

3. The motor of claim 1 wherein:
   when no electrical power is applied to the motor the rotor portion preferably comes to rest with said radially polarized zones slightly offset from alignment with said pole portions.

4. The motor of claim 3 wherein:
   the direction of said offset is toward the end of said pole portion having a greater amount of conducting material.

5. In a brushless direct current electric motor having a shaft mounted rotor portion including a plurality of alternately radially polarized zones and a stator portion including a plurality of pole portions, each pole portion having one pair of prong portions extending circumferentially outward from the central radius of the pole portion, the improvement comprising:
   the prong portions are formed such that the prongs of each pair are exteriorally symmetrical in shape and such that a constant airgap is maintained between the prong portions and the polarized zones; and
   one of the prongs in each pair is altered by forming one or more apertures therein so as to form an altered prong with a lesser amount of conducting material present in the altered prong than in the unaltered prong in each pair, such that the magnetic reluctance of said altered prong, with the lesser amount of conducting material, is greater than that of the unaltered prong in each pair.

6. The improvement of claim 5 wherein:
   a plurality of apertures are formed in said altered prong, said apertures being graduated such that the degree of mass alteration near the exterior end of said altered prong is greater than near the central radius.

* * * * *